United States Patent [19]

Shacklette et al.

[11] Patent Number: 4,695,521

[45] Date of Patent: Sep. 22, 1987

[54] CONJUGATED POLYMER AS SUBSTRATE FOR THE PLATING OF ALKALI METAL IN A NONAQUEOUS SECONDARY BATTERY

[75] Inventors: Lawrence W. Shacklette; James E. Toth, both of Maplewood; Ronald L. Elsenbaumer, Morristown, all of N.J.

[73] Assignee: Allied Corporation, Morris Township, Morris County, N.J.

[21] Appl. No.: 749,325

[22] Filed: Jun. 27, 1985

[51] Int. Cl.$^4$ .......................................... H01M 10/40
[52] U.S. Cl. .................................... 429/194; 429/213
[58] Field of Search ................ 429/213, 194, 199, 197

[56] References Cited

U.S. PATENT DOCUMENTS

| | | | |
|---|---|---|---|
| 4,002,492 | 1/1977 | Rao | 429/194 |
| 4,294,304 | 10/1981 | Delassus | 164/504 |
| 4,321,114 | 3/1982 | MacDiarmid et al. | 429/213 X |
| 4,442,187 | 4/1984 | MacDiarmid et al. | 429/213 |
| 4,472,489 | 9/1984 | Maxfield et al. | 429/213 |
| 4,522,901 | 6/1985 | Shacklette | 429/213 X |

FOREIGN PATENT DOCUMENTS 0070107 1/1983 European Pat. Off. .

OTHER PUBLICATIONS

*J. Physique* vol. 44 (1983) pp. 579–588.
*J. Physique.* vol. 44 (1983) pp. 617–621, "Temperature Study of Infrared Reflection Spectra on Various Faces of MTPP(TCNQ)$_2$ Single Crystals.
*J. Physique.* vol. 44 (1983) pp. 537–452, "Variation with Temperature of the Thickness of an Adsorbed Polymer Layer in the Collapsed State".
*J. Electrochem. Soc.* (1977) pp. 1490–1492 "Lithium–Aluminum Electrode".
*J. Electroanal. Chem.* 94 (1978) 77–81 "Cycling Behaviour and Corrosion of Li—Electrodes in Organic Electrolytes".
*Mat. Res. Bull.* vol. 13, pp. 1395–1402 "Topochemical Reactions of Rutile Related Structures with Lithium".
*J. Physique* 44 (1983) pp. 147–162 "Devil's Staircase Without Periodicity in Classical Condensed Matter".
*J. Physique* 44 (1983) pp. 137–140 "Fluctuations du parcours de particules chargees ayant depose la memo quantite denergie dans la matiere".

*Primary Examiner*—Donald L. Walton
*Attorney, Agent, or Firm*—Richard C. Stewart; Gerhard H. Fuchs

[57] ABSTRACT

This invention relates to a novel anode for use in batteries, and to batteries containing the anode, which anode comprises of an electronically conductive n-doped conjugated backbone polymer having finely divided elemental alkali metal particles dispersed therein.

18 Claims, No Drawings

CONJUGATED POLYMER AS SUBSTRATE FOR THE PLATING OF ALKALI METAL IN A NONAQUEOUS SECONDARY BATTERY

BACKGROUND OF THE INVENTION (1) Field of the Invention

This invention relates to polymeric electrodes. More particularly, this invention relates to negative electrodes for non-aqueous secondary batteries composed of conjugated backbone polymers and alkali metals which are plated on or distributed throughout the polymer matrix.

(2) Prior Art

Conjugated backbone polymers, e.g., polyacetylene, polyphenylene, polyacenes, polythiophene, poly(phenylene vinylene), polyazulene, poly(phenylene sulfide), poly(phenylene oxide), polythianthrene, poly(phenylquinoline), polyaniline, poly(N-methyl-carbazole), and polypyrrole, have been suggested for use in a variety of applications based upon their characteristic of becoming conductive when oxidized or reduced either chemically or electrochemically. The secondary battery application described by, e.g., MacDiarmid et al. in U.S. Pat. No. 4,442,187 (1984); *J. de Physique,* Colloque C3, Vol. 44 (1983), articles beginning on page 579, page 615 and page 537; and K. Kaneto et al., *Japanese J. of Applied Physics,* Vol. 22, pp. L567–L568 (September 1983) and pp. L412–L414 (July 1983), employs one or more electrodes having conjugated backbone polymers as the electroactive material. Such electrodes can, for example, be electrochemically n-doped by reversible insertion of alkali metal cations or tetraalkylammonium cations during battery cycling, most commonly with insertion of cations into a polymer anode (the negative battery electrode) occurring during charging. The more such cations are inserted, the more conductive the electrode becomes and the more cathodic the potential of the anode becomes. This electrochemical doping process is described by MacDiarmid et al. in U.S. Pat. No. 4,321,114 (1982).

Lithium and lithium alloys have been suggested for use as the negative electrode in electrochemical cells. For example, U.S. Pat. No. 4,002,492 discloses electrochemical cells having an anode consisting essentially of lithium aluminum alloys that contain lithium in amounts between about 63% and 92% and the balance essentially aluminum. Anodes composed of lithium and aluminum are also disclosed in Rao, et al., *J. Electrochem. Soc.* 124, 1490 (1977), And Besenhard, *J. Electroanal. Chem.,* 94, 77 (1978).

An application of Matsushita (kokai 58-163184) discloses the use of electroconductive polymer as a covering at the surface of the electrode to protect against short circuiting because of dendrite growth.

European Pat. No. 0070107 A1; Murphy et al., *J. Electrochem. Soc.,* 126, 349 (1979) and Murphy et al., *Mat. res. Bull.,* 13, 1395 (1978) disclose batteries based on lithium intercalation in layered dichalcogenides for use as cathodes.

Composite structures of a conjugated backbone polymer and a non-electroactive material have been described in U.S. Pat. No. 4,294,304 and in the above *J. de Physique* issue, articles beginning on page 137 and on page 151. Representative other components that have been blended with polyacetylene or onto which polyacetylene or polypyrrole have been deposited include polyethylene, polystyrene, graphite, carbon black, NESA glass and silicon. In selected instances, such composite structures have been suggested for use in batteries, see Showa Denko K. K., European Published Patent Application No. 76,119 (1982).

While batteries have heretofore been constructed in which a conjugated backbone polymer comprises the largest part of the electroactive material, such batteries suffer from a number of disadvantages. For example, such cells have heretofore exhibited strongly varying discharge potentials. Moreover, such cells have relatively low volumetric energy densities.

Batteries to be used at room temperature which are constructed with anodes composed of lithium or lithium alloys such as lithium/aluminum alloys, also suffer from a number of disadvantages. While lithium is inherently rechargeable, it's practical rechargeability is poor because at practical current densities metallic lithium is electrodeposited in the form of dendrites which can eventually lead to shorting out of the cell. High discharge rates can also result in irreverible shape changes in the electrode. In order to minimize the effects of dendritic growth, it has been suggested to employ cell separators, such as permeable membranes or the composite of Kokai 58-163184, which act as physical barriers to dendritic growth. Although these solutions are initially effective, eventually the lithium dendrites may penetrate the barriers and establish transient of permanent electronic shorts. It has been suggested that use of alloys of lithium with a less reactive metal, as for example, alloys of lithium and aluminum obviate certain of the disadvantages attendant to the use of lithium as the anodic material. See for example, U.S. Pat. No. 4,002,492. However, such batteries have exhibited relatively low capacities (utilization), low rate capabilities and poor cycle lifes.

SUMMARY OF THE INVENTION

Generally speaking, the present invention obviates one or more of the disadvantages of polymer batteries, and lithium and lithium alloy anode batteries by providing an improved anode for high energy density electrochemical cells whic include a cathode containing a cathode active material, an anode containing an anode active material, and a non-aqueous electrolyte having an ionic salt of the anode active material dissolved therein. More particularly, the improved anode of this invention comprises a porous conjugated backbone polymer or copolymer, or a blend of a porous conjugated polymer with one or more porous conjugated or non-conjugated backbone polymers having elemental alkali metal which is plated on the electroconductive polymer matrix or otherwise dispersed therein. The present invention also provides a battery incorporating the novel anode of this invention, which battery comprises:

(a) a cathode;

(b) an electrolyte comprising an organic solvent and an alkali metal-salt; and (c) an anode comprising a porous conjugated backbone polymer or copolymer, or a blend of a porous conjugated backbone polymer with one or more conjugated or non-conjugated backbone polymers, with the conjugated polymer components being in a reduced (n-doped) electronically conductive form during at least part of the battery cycle, and having dispersed therein elemental alkali metal; said alkali-metal cations in said electrolyte diffusion into said porous polymer or copolymer and depositing as elemental alkali metal during at least part of the charging cycle of said battery, and said elemental metal being converted into alkali metal cations during the discharging of said battery.

DESCRIPTION OF THE PREFERRED EMBODIMENTS

As an essential component, the battery of this invention includes an anode which comprises a mixture of one or more porous conjugated backbone polymers or copolymers, or blends of one or more conjugated polymers or copolymers with one or more conjugated or non-conjugated backbone polymers or copolymers (hereinafter referred to collectively as "conjugated backbone polymers), with at least one of said conjugated backbone polymers being capable of electrochemical n-doping (insertion by alkali metal cations) to an electronically conductive state ($\geqq 10^{-3}$ S/cm), and which polymers, copolymers or blends having dispersed therein elemental alkali metal. The structure of this anode can vary widely. For example, the anode can be in the form of a porous film of the conjugated backbone polymer with the elemental alkali metal being dispersed therein. In the preferred embodiments, the anode is comprised of compressed powders of conjugated backbone polymers filled by elemental alkali metal which has been electrodeposited by reduction of alkali metal ions in a suitable nonaqueous electrolyte at sufficiently low current density to achieve the desired dispersion of elemental alkali metal within the body of the electrode.

Useful polymers may be any of the variety of electrochemically n-dopable conjugated backbone polymers known to those of skill in the art for use as negative electrodes in batteries. In general, such polymers are sufficiently porous to allow the inflow and outflow of electrolyte solvent containing dissolved alkali metal cations, and to provide sufficient space for the deposition of elemental alkali metal inside of the conjugated backbone polymer substrate during the charging and discharging of the battery, respectively. In general, these objectives can be achieved when the porosity of the polymer is at least about 20 volume percent (v/o). In the preferred embodiments of the invention, the porosity of the polymer is at least about 25 volume percent (v/o), and in the particularly perferred embodiments is from about 30 volume percent (v/o), to about 70 volume percent (v/o). Amongst these particularly preferred embodiments of the invention, most preferred are those embodiments of the invention in which the porosity of the substrate is about 50 volume percent (v/o). Furthermore, the polymer must be of sufficient molecular weight to function as a solid substrate during the charging of the battery. Useful conjugated backbone polymers may be conjugated backbone homopolymers or copolymers, or blends of one or more conjugated backbone homopolymers or copolymers with one or more conjugated backbone or non-conjugated backbone homopolymers or copolymers. Useful conjugated backbone polymers can vary widely and include polyacetylene, polyphenylene, (if in the para form), poly(phenylene vinylene) and the like, and blends thereof with other polymers having either conjugated or non-conjugated backbones, such as polyethylene and polypropylene. Other conjugated backbone polymers claimed by others as useful in batteries may also be used in the present invention. Such polymers include the hydrocarbon polymers: polyazulene, poly(perinaphthalene), polyacenes, poly(napthalene-2,6-diyl), and the like and polymeric blends thereof. Amongst these illustrative conjugated backbone polymers, polyacetylene, poly(phenylene vinylene) and poly(p-phenylene) are preferred, and polyacetylene and poly(p-phenylene) are particularly preferred. Most preferred for use in the practice of this invention is poly(p-phenylene).

Useful conjugated backbone polymers are known compounds which can be prepared by conventional means. For example, high quality polyacetylene, a preferred conjugated backbone polymer, can be conveniently prepared by the procedures described in a series of papers by Shirakawa, et al., *Polymer Journal*, Vol. 2, No. 2, pp. 231-244 (1971); *Polymer Journal*, Vol. 4, No. 4, pp. 460-462 (1973); *Journal of Polymer Science Part A-1*, Polymer Chemistry Edition, Vol. 12, pp. 11-20 (1974), and *Journal of Polymer Science A-1*, Polymer Chemistry Edition Vol. 13, pp. 1943-1950 (1975), all of which are incorporated herein by reference. Moreover, forms of high quality poly(p-phenylene), another preferred conjugate backbone polymer, can be prepared by the method of Kovacic described in detail in *J. Am. Chem. Soc.* 85, 454-458 (1963), incorporated herein by reference. Furthermore, poly(phenylene vinylene), another preferred conjugated backbone polymer, can be prepared by the procedure described in U.S. Pat. No. 3,404,132 of R. A. Wessling et al.

The second essential component of the anode of this invention is elemental alkali metal which is distributed throughout the electrode. Preferred alkali metals are lithium and sodium, and particularly preferred for use is sodium. In the preferred embodiments of the invention, the alkali metal is electrodeposited on and/or in the conjugated backbone polymer substrate in a step prior to battery assembly or during the charging of the battery. The porosity of the polymer substrate and current density are adjusted to achieve the necessary dispersal of alkali metal throughout the bulk of the polymer substrate.

The amounts of the various components in the anode can vary widely, depending on a number of factors, as for example, the balance chosen between electrochemical capacity, the porosity of the polymer, the desired mechanical properties of the anode and the like. In general, the amount of the conjugated backbone polymer component in the anode should be sufficient to provide useful capacities and to impart mechanical stability and good cycle life to the electrode. In the preferred embodiments of the invention, the amount of the conjugated backbone polymer component may vary from about 50 to about 95 percent by weight based on the total weight of the polymer and alkali metal in the anode, and in the particularly preferred embodiments up from about 70 to about 90 by weight on the aforementioned basis.

The anode may include other optional materials known to those of skill in the battery art, and these will not be described herein in great detail. In brief, by way of illustrative examples, the anode may include such other substituents as conductivity aids such as carbon black; inert binders such as saturated backbone hydrocarbon polymers and halocarbon polymers such as polyethylene, propylene-trifluoroethylene copolymer, and poly(tetrafluoroethylene); mechanical supports; current collectors and the like. Hydrocarbon binders such as polypropylene are generally employed with powdered forms of the conjugated polymers.

The anode may also be coated with other materials to allow use of the anode with solvents which would otherwise react with the conjugated backbone polymer in the reduced state. For example, the anode can be coated with the reaction product of an oxirane compound as described in U.S. Pat. No. 4,472,487, with the reaction product of an organsulfur compound as described in U.S. Pat. No. 4,472,489 and with the reaction product of certain cyclic compounds as described in U.S. Pat. No. 4,472,488. Each of these patents are incorporated herein by reference.

The particular polymer and alkali metal chosen for use in any particular situation may vary widely. However, in the preferred embodiments of the invention the polymer and metal are selected such that the voltage range of reversible electroactivity of the polymer closely matches or more preferably encompasses the electrochemical potential of the alkali metal.

The method of fabricating the anode is not critical and can be varied widely. Any method known to those of skill in the art for fabricating polymer substrates having porosity in the range of 25 to 74 volume percent can be used. In the preferred embodiments, the anode is fabricated as follows. The polymer which is conjugated or becomes conjugated in its reduced state is in the form of a dry powder, a gel, or a suspension in a suitable solvent. This conjugated polymer may be combined with other additives, such as binders and conductivity aids. This mixture is mechanically or ultrasonically blended or grounded together to form an intimate mixture of small particles (less than about 10 $\mu$m). This mixture is then compressed onto a current collector into the desired shape of the electrode. In some instances, it may be further desirable to carry out a final heat setting step. The conditions of the final pressing and heat setting step are adjusted to achieve the desired porosity. The conjugated polymer of this electrode may be chemically or electrochemically reduced to an n-type conducting state, preferably after electrode fabrication, but either before or after cell or battery assembly. Finally, excess alkali metal in a zero-valent state (elemental alkali metal) is added to the electrode preferably by electrodeposition either prior to final assembly or during the charging of said battery or electrochemical cell. The current density for the electrodeposition must be maintained at a sufficiently low value to avoid the production of dendrites at the electrode surface and to achieve a dispersal of alkali metal within the interior of the porous electrode.

The organic solvents which may be included in the electrolyte of the batteries of the present invention may vary widely and can be organic solvents normally used in batteries. Preferably, these solvents should be electrochemically inert to oxidation and reduction during use while simultaneously being capable of dissolving the desired alkali metal salt at a concentration of preferably about 0.5M and more preferably about 1M, capable of wetting the polymer, and providing an ionic conuductivityabout equal to or in excess of about $10^{-4}$ S/cm, preferably about equal to or greater than about $10^{-2}$ S/cm. Examples of such useful organic solvents include propylene carbonate, ethylene carbonate, sulfonate, methyl sulfolane, dimethyl sulfolane, 3-methyl-2-oxazolidone, alkane sultones, e.g., propane sultone, butane sultone (the use of sultones as electrolyte compositions is the subject of a related, commonly-assigned U.S. patent application Ser. No. 556,717, and the use of sultones for coatings on polymer anodes is the subject of a related, commonly-assigned U.S. Pat. No. 4,472,489), dimethyl sulfoxide (DMSO), dimethyl sulfite, tetrahydrofuran (THF), 2-methyltetrahydrofuran (2-MTHF), dioxane, dioxolane, 1,2-dimethoxyethane (DME), dimethoxymethane, diglyme and glymes. Mixtures of such available organic solvents may also be used, such as mixtures of sulfolane and dimethoxyethane, or mixtures of propylene carbonate and dimethoxyethane.

The organic solvents chosen for use in any particular situation will, of course, depend upon many factors such as the precise electrolyte composition used and the voltage range desired, as well as the choice of cathode and other components of the battery used. A particularly important consideration in choosing a solvent is whether the n-doped conjugated backbone polymer employed is subject to attack by the solvent. In the preferred embodiments of the invention when either coated or uncoated anodes are employed, ether-type solvents such as tetrahydrofuran, dimethoxyethane, diglyme, 2-methyltetrahydrofuran and mixtures thereof are employed because these solvents are generally not reactive with conjugated backbone polymers, when in their neutral or reduced forms.

Salts for use in the electrolyte of the battery of this invention are of the formula:

MA wherein:

M is an alkali metal cation; and

A is a species which is anionic in the electrolyte and stable under operational conditions.

Preferred alkali metal cations are lithium, sodium and potassium, and the particularly preferred alkali metal cations and lithium and sodium. Amongst these particularly preferred embodiments sodium is the most preferred cation. Suitable anionic species include $I^-$, $Br^-$, $Cl^-$, $ClO_4^-$, $PF_6^-$, $AsF_6^-$, $BF_4^-$, $AlCl_4^-$, alkylborates, such as $B(CH_3)_4^-$ and $B(C_2H_5)_4^-$, arylborates, such as $B(C_6H_5)_4^-$, fluorinated organoborates, and organofluoroborates, such as $B(p-FC_6H_4)_4^-$ and $F_2B(C_6H_4)_2^-$, sulfonates, such as $CF_3SO_3^-$, $CF_3(C_6H_4)SO_3^-$, $C_6H_4SO_3$ and $CH_3(C_6H_4)SO_3^-$, $POF_4^-$, $CN^-$, $SCN^-$, $OCN^-$, $CF_3CO_2^-$ (trifluoroacetate), $C_6H_5CO_2^-$ (benzoate), $HSO_4^-$ and the like. Preferred anions are organoborates such as alkylborates, arylborates, or alkylarylborates, $PF_6^-$, $ClO_4^-$, fluoroboraes and sulfonates such as $CF_3SO_3^-$, $CH_3(C_6H_4)SO_3^-$ and $C_6H_4SO_3^-$, and particularly preferred anions are alkylborates, and arylborates, alkylarylborates and $PF_6^-$.

Cathodes for use in the practice of this invention are not critical and can be varied widely. Suitable cathodes include materials selected from the group consisting of graphite, intercalation compounds of graphite, high surface area carbons (>200 m$^2$/g), transition-metal chalcogenides, and conjugated backbone polymers which are capable of being oxidized (acceptor-doped). Transition-metal chalcogenides and conjugated backbone polymers are preferred cathode materials, especially those having an operating voltage about equal to or greater than 1.5 V with respect to the anode.

The transition-metal chalcogenides, suitable as cathode materials useful in this invention, can contain inserted alkali metals and include the transition-metal dichalcogenides such as TiS$_2$ and, among others, those listed on page 392 of "Lithium Batteries" edited by J. P. Gabano (Academic Press, 1983) and in K. M. Abraham, Solid State Ionics, vol. 7, pp. 199–212 (1982) (both incorporated herein by reference). These include (with approximate open circuit potentials measured in various organic electrolytes when fully charged nearly or devoid of inserted cations):

| | |
|---|---|
| $Na_xTiS_2$ | 2.1V versus $Na/Na^+$ |
| $Na_xNbS_2Cl_2$ | 2.2V versus $Na/Na^+$ |
| $Li_xMoS_2$ | 2.3V versus $Li/Li^+$ |
| $Li_xFe_{0.25}V_{0.075}S_2$ | 2.4V versus $Li/Li^+$ |
| $Li_xTiS_2$ | 2.5V versus $Li/Li^+$ |
| $Li_xMoS_3$ (amorphous) | 2.5V versus $Li/Li^+$ |
| $Na_xWO_{3.31}·y$ | 2.6V versus $Na/Na^+$ |
| $Na_xMoS_3$ (amorphous) | 2.7V versus $Na/Na^+$ |
| $Na_xTaS_2$ | 2.7V versus $Na/Na^+$ |
| $Li_xMoO_3$ | 2.8V versus $Li/Li^+$ |
| $Li_xV_6O_{13}$ | 2.9 versus $Li/Li^+$ |
| $Li_xCr_{0.5}V_{0.5}S_2$ | 2.9V versus $Li/Li^+$ |
| $Li_xW_{0.2}V_{2.8}O_7$ | 3.0V versus $Li/Li^+$ |
| $Li_xCr_3O_8$ | 3.6V versus $Li/Li^+$ |
| $Na_xCoO_2$ | 3.7V versus $Na/Na^+$ |
| $Li_xCoO_2$ | 4.7V versus $Li/Li^+$ |

Suitable polymer cathodes include oxidized polyacetylene, poly(p-phenylene), polyacenes, poly(phenylene vinylene), polyazulene, polynaphthalene, poly(phenylene sulfide), poly(phenylene oxide), polyphenothiazine, polyaniline, polypyrrole, polythiophene, polythianthrene and substituted versions of the above. Such polymers may be coated by reaction, when oxidized, with pyrroles, thiophenes, azulenes, anilines or furans, as described in commonly-assigned U.S. Pat. No. 4,472,988, the disclosure of which is incorporated herein by reference.

The secondary battery of this invention can be charged and discharged in accordance with the procedure described in U.S. Pat. No. 4,321,114. Such procedures are well known to those of skill in the art and will not be described herein in any great detail.

The following specific examples are presented to more particularly illustrate the invention and are not to be construed as limitations therein.

EXAMPLE I

A. Using the method of Migazaki, et al. Syn Metals 6 211–217 (1983), $Na_xCoO_2$ was synthesized in accordance with the following equation:

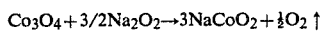

In this procedure, $Na_2O_2$ (Alfa Products, purity: 93% min.) and $Co_3O_4$ (Cerac, purity: 99.5%) were combined in a 1.5:1.0 molar ratio and thoroughly mixed in a blender. The mixture was then heated to 500° C. in a quartz tube for 36 hrs. in air. Some etching of the quartz was observed. Later analysis suggested that a composition, $Na_{0.8}CoO_2$, had been obtained. Subsequent treatment with sodium benzophenone ketyl raised the sodium content to approximately $NaCoO_2$.

Teflon binder was reocvered from DuPont TFE-fluorocarbon Resin Dispersion, Product Type 30 by addition of acetone. After the Teflon had settled out, it was filtered, washed with additional acetone and air dried.

B. A mixture of 85% $NaCoO_2$ (prepared as described in section A) 10% Shawinigan black and 5% Teflon #30 (total mass ~50 mg) was ground with a mortar and pestle until it formed a single cohesive mass. The film-like material was then folded upon itself, wetted with 2-propanol and pressed between 2 polished stainless-steel plates at ca. 100 MPa for 3 sec. The material was then folded upon itself once again, rewet, and repressed. This procedure was repeated for a total of 3 times, after which the $NaCoO_2$ was pressed onto a preweighed platinum screen (0.7×2.5 $cm^2$). The electrode was then vacuum dried at 25° C. for 12 hours. A cell was assembled with a sodium counter electrode in an electrolyte of 1.3M $NaPF_6$, DME. The $NaCoO_2$ electrode was cycled twice at a current of 0.5 mA (0.3 $mA/cm^2$) between the voltage limits of 3.6 to 2.0 V vs $Na/Na^+$. The capacity was 4.4 mAh (2.5 $mAh/cm^2$) which was equivalent to a composition change from $NaCoO_2$ to $Na_{0.58}CoO_2$ or approximately 85% of theoretical capacity for the voltage limits used.

C. Poly(p-pheneylene), PPP, was synthesized by the method of Kovacic, J. Org. Chem. 29, 100 (1964), using an $AlCl_3$, $CuCl_2$ catalyst. Pulpex TM polypropylene synthetic pulp was acquired from Hercules. A mixture of 80% PPP, 10% Sawinigan Black TM and 10% Pulpex P was thoroughly blended then pressed onto pre-weighed nickel grid at 27.5 MPa in a rectangular press (0.7×2.5 $cm^2$). The electrode was then removed and heat set at 160° C. for 15 min. in air.

D. Sodium hexafluorophosphate, $NaPF_6$, obtained from Alfa Ventron was dried under vacuum for 24 hours at 100° C. Dimethoxyethane, DME, which had been dried by vacuum distillation from a solution with sodium benzophenone ketyl was added to the $NaPF_6$ to form a 1.3 molar solution. This solution was further purified by stirring over a liquid amalgam of sodium and mercury. Finally, the solids were allowed to settle and the purified electrolytic solution was removed.

E. A battery was assembled as follows. Each of the PPP anode described in Section C and $NaCoO_2$ cathode described in Section B was wrapped with glass filter paper and inserted into a glass container. The container was evacuated and taken within an Argon-filled dry box. The electrolyte, 1.3M $NaPF_6$, DME, whose preparation is described in Section D, was added in an amount sufficient to fully cover both electrodes.

EXAMPLE II

As assembled, the battery of Example 1 contained enough sodium for approximately 80% theoretical capacity (4 mAh) if no sodium were lost to reaction with impurities during initial cycling. More sodium (2.5 mAh) was added by inserting a third electrode composed of sodium and passing charge between this sodium electrode and the PPP electrode. The cell (PPP vs $NaCoO_2$) was cycled between fixed voltage limits, 3.6 to 1.6 V, at a current of 1 mA (0.6 $mA/cm^2$) for the first 8 cycles (the sodium reference being removed after cycle #5), then at 2 mA (1.2 $mA/cm^2$) until cycle number 172 and then at 1 mA until cycle number 223 where cycling was terminated.

Because excess sodium was added, it was found on the 8th cycle that the PPP electrode attained a potential of 0V vs $Na/Na^+$ with sodium metal being plated and stripped from this electrode over about 75% of its observed 4 mAh capacity (i.e., about 3 mAh of sodium was being plated and stripped as sodium metal on each cycle). On cycle #194 when the overall capacity of the cell had declined to about 3 mAh, sodium metal was still being plated and stripped over about 75% of the cell's capacity (2.25 mAh). Thus, very little sodium metal was lost in the 194 cycles and high efficiency for sodium plating and stripping on a PPP substrate has been demonstrated. No evidence for shorting due to sodium dendrites was found over the entire 223 cycles.

EXAMPLE III

A half cell was assembled which comprised a PPP electrode constructed as in Example 1 and a sodium reference and counter electrode in an electrolyte of 1M $NaPF_6$ in DME. An initial cycle was made between 1.5 and 0.0 volts vs $Na/Na^+$ such that $Na^+$ ions were inserted and extracted from PPP without the plating of sodium metal. Three more cycles were then made (summarized in the Table I below) which involved both the insertion and extraction of $Na^+$ ions in PPP and the plating of sodium metal on the electronically conductive substrate comprised of the sodium ion complex with PPP. The cycling results demonstrate high efficiency for the plating and stripping of sodium from a conductive PPP substrate.

TABLE I
DEPOSITION OF Na° ON
POLY(p-PHENYLENE) SODIUM COMPLEX

| Cycle No. | Total Capacity[1] (mAh/cm²) | Na Plating[2] (mAh/cm²) | C.E. (Overall Coulombic Efficiency)[3] (%) |
|---|---|---|---|
| 2 | 3.88 | 1.88 | 98.2 |
| 3 | 3.74 | 1.61 | 98.4 |
| 4 | 5.13 | 3.00 | 95.7 |

[1]Observed capacity for $Na^+$ ion insertion in PPP plus sodium plating.
[2]Part of total charge attributable to the plating of sodium metal.
[3]C.E. = (total charge for stripping + ion extraction) ÷ (total charge for plating + ion insertion)

COMPARATIVE EXAMPLE IV

A battery was asembled as described in Example I with a sodium metal anode containing no conjugated $NaCoO_2$ cathode, and 1.3M $NaPF_6$, DME electrolyte. The cell was cycled between fixed voltage limits, 3.6 to 2.0, at a current of 1 mA (0.6 mA/cm²). Upon the fifth charging cycle the cell could not attain a voltage of 3.6 even after passing charge equivalent to three times the theoretical capacity. Disassembly of the cell revealed that sodium had grown through the glass filter paper and connected the sodium anode to the $NaCoO_2$ cathode causing an internal short.

What is claimed is:

1. A battery comprising:
   (a) an anode comprising a porous conjugated backbone polymer substrate, wherein said conjugated backbone polymer is reduced (n-doped) before or during the charging of said battery and, has dispersed therein elemental alkali metal;
   (b) an electrolyte comprising an organic solvent containing dissolved alkali-metal salt, and
   (c) a cathode;
said alkali-metal from said electrolyte being electrodeposited in and/or onto said polymer substrate as elemental alkali metal during at least a part of the charging cycle of said battery, and said elemental alkali metal being converted into alkali metal cations during the discharging of said battery.

2. The battery of claim 1 wherein said conjugated backbone polymer of said anode is polyacetylene, poly(p-phenylene) or poly(p-phenylene vinylene).

3. The battery of claim 2 wherein said polymer is polyacetylene or poly(p-phenylene).

4. The battery of claim 3 wherein said polymer is poly(p-phenylene).

5. The battery of claim 1 wherein said alkali-metal salt of said electrolyte is a lithium salt, sodium salt or mixture thereof.

6. The battery of claim 5 wherein said alkali metal salt is a sodium salt.

7. The battery of claim 1 wherein said cathode is a transition metal chalcogenide or a conjugated backbone polymer having an operating voltage about equal to or greater than 1.5 V with respect to the anode.

8. The battery of claim 7 wherein said cathode is a transition metal calcogenide.

9. The battery of claim 8 wherein said chalcogenide is $Li_xTiS_2, Li_xV_6O_{13}, Li_xMoS_2, Li_xCoO_2$ or $Na_xCoO_2$.

10. The battery of claim 1 wherein said polymer is polyacetylene or poly(p-phenylene), said alkali metal salts are salts containing sodium cations, and said cathode is $Na_xCoO_2$.

11. The battery of claim 1 wherein said solvent is an ether or a mixture of ethers.

12. The battery of claim 11 wherein said ethers are selected from the group consisting of 2-methyltetrahydrofuran, tetrahydrofuran, and dimethoxyethane.

13. The battery of claim 1 wherein said alkali-metal salt is selected from the group consisting of alkali metal organoborate salts, hexafluorophosphate salts, fluoroborate salts, organosulfonate salts, perchlorate salts and halide salts.

14. The battery of claim 13 wherein said salt is selected from the group consisting of alkali metal alkylborate, arylborate, arylalkylborate and hexafluorophosphate salts.

15. The battery of claim 14 wherein said salt is selected from the group consisting of alkali metal hexafluorophosphate salts.

16. A battery comprising:
   (a) an anode comprising poly(p-phenylene) substrate having dispersed therein elemental sodium metal;
   (b) an electrolyte comprising $NaPF_6$ or a sodium organoborate and a solvent selected from the group consisting of one or more ethers; and
   (c) a cathode comprising $Na_xCoO_2$;
said sodium ions in said electrolyte being deposited in and/or on said poly(p-phenylene) substrate as elemental sodium metal during at least a part of the charging cycle of said battery and said sodium metal being converted into sodium cations during the discharging of said battery.

17. A battery according to claim 16 wherein said solvent is selected from the group consisting of tetrahydrofuran, 2-methyltetrahydrofuran, and dimethoxyethane.

18. A battery according to claim 16 which further comprises a current collector, encased in said polymeric substrate.

* * * * *